US012166263B2

(12) United States Patent
Crouch et al.

(10) Patent No.: US 12,166,263 B2
(45) Date of Patent: Dec. 10, 2024

(54) COAXIAL-TO-WAVEGUIDE POWER COMBINER/DIVIDER COMPRISING TWO FINS DISPOSED IN A PLANE OF THE WAVEGUIDE AND CONNECTED TO PLURAL COAXIAL INPUTS/OUTPUTS

(71) Applicant: Raytheon Company, Waltham, MA (US)

(72) Inventors: David D. Crouch, Eastvale, CA (US); Eachan Russell Landreth, Edgewood, NM (US); David R. Sar, Corona, CA (US)

(73) Assignee: Raytheon Company, Tewksbury, MA (US)

( * ) Notice: Subject to any disclaimer, the term of this patent is extended or adjusted under 35 U.S.C. 154(b) by 310 days.

(21) Appl. No.: 17/659,865

(22) Filed: Apr. 20, 2022

(65) Prior Publication Data

US 2023/0344104 A1 Oct. 26, 2023

(51) Int. Cl.
*H01P 5/12* (2006.01)
*H01P 5/103* (2006.01)
*H01P 5/16* (2006.01)

(52) U.S. Cl.
CPC ................ *H01P 5/12* (2013.01); *H01P 5/103* (2013.01); *H01P 5/16* (2013.01)

(58) Field of Classification Search
CPC .................................. H01P 5/103; H01P 5/12
USPC .................................................... 333/125, 26
See application file for complete search history.

(56) References Cited

U.S. PATENT DOCUMENTS 2,909,735 A * 10/1959 Hessler, Jr. ............. H01P 5/103 333/127
2,981,904 A * 4/1961 Ajioka et al. ........... H01P 5/103 333/34
3,383,630 A * 5/1968 Kuroda ..................... H01P 5/12 333/137
4,240,051 A * 12/1980 Haugsjaa et al. ......... H01P 5/12 333/127
8,427,382 B2 4/2013 Crouch
10,770,775 B2 9/2020 Kinsey
2012/0262248 A1* 10/2012 Bao ........................... H01P 5/12 333/26

OTHER PUBLICATIONS

Amjadi et al., "Design of a Broadband Eight-way Coaxial Waveguide Power Combiner;" IEEE Transactions on Microwave Theory and Techniques, vol. 60, No. 1; Jan. 2012; 7 Pages.

* cited by examiner

*Primary Examiner* — Benny T Lee

(57) ABSTRACT

An apparatus for and a method of a coaxial-to-waveguide power combiner/divider. The apparatus includes a single-fin coaxial-to-waveguide power combiner/divider, including a waveguide having one open end, one closed end, and two sides that are broader than two other sides; two fins in a plane within the waveguide, wherein the plane is configured to be parallel to the broader sides of the waveguide; and at least one coaxial input joined to each of the two fins. Signals may be applied to the at least one coaxial input joined to each of the two fins are in phase with each other, and a number of the at least one coaxial input joined to each of the two fins may include one of a same number and a different number.

20 Claims, 11 Drawing Sheets

COAXIAL-TO-WAVEGUIDE POWER COMBINER/DIVIDER COMPRISING TWO FINS DISPOSED IN A PLANE OF THE WAVEGUIDE AND CONNECTED TO PLURAL COAXIAL INPUTS/OUTPUTS

BACKGROUND

Power combiners and dividers have long been key elements in radio frequency (RF), microwave and millimeter-wave systems. At low power levels, a coaxial transmission line is often the transport medium of choice as coaxial components, transmission lines, cables, and connectors are compact, inexpensive, and readily available. Moreover, many types of coaxial transmission line are flexible, which has obvious advantages.

For high-power applications, a waveguide is the preferred transport medium as a waveguide may handle very high-power levels without risk of breakdown.

A conventional binary waveguide power divider has been used to feed planar array antennas. Such networks are constructed from numerous Y or T waveguide junctions, which tend to be bulky, especially at lower frequencies, and cannot accommodate arbitrary numbers of outputs.

Power combiners/dividers having many coaxial inputs and a single output are also known. Such combiners are useful in that a coaxial transmission line is a convenient transmission media at low to medium power levels. At sufficiently high-power levels, however, a coaxial transmission line becomes an unsuitable medium over which to transport electromagnetic energy. In such situations, a waveguide output is required.

SUMMARY OF THE INVENTION

In accordance with the concepts described herein, example coaxial-to-waveguide power combiner/divider devices and methods provide a wideband power combiner/divider having a number of coaxial-to-waveguide transitions to provide a bridge between multiple transport media.

In accordance with the concepts described herein, example coaxial-to-waveguide power combiner/divider devices and methods provide a wideband coaxial/waveguide interface capable of withstanding high peak power levels without breakdown.

In accordance with the concepts described herein, an example coaxial-to-waveguide power combiner/divider device is provided where a center conductor of each coaxial input line is joined to a tapered fin interface attached to one of the two broad walls of the example waveguide, where the example waveguide may be rectangular.

In accordance with the concepts described herein, example coaxial-to-waveguide power combiner/divider devices and methods are provided that accommodate two or more fins, where each fin is broad and capable of accommodating multiple coaxial inputs.

In accordance with the concepts described herein, example coaxial-to-waveguide power combiner/divider devices and methods provide two tapered fins on either a top or a bottom broad waveguide wall, where all coaxial inputs have a common phase (e.g., the inputs signals being combined have the same phase).

In accordance with the concepts described herein, an example coaxial-to-waveguide power combiner/divider device and method provides symmetric fins on a top broad wall and a bottom broad wall of the waveguide to deposit power into the waveguide, where RF inputs to coaxial feeds on the top broad wall and the bottom broad wall are 180 degrees out of phase. That is, the RF input signal inputs to the feeds on the top broad wall are 180 degrees out of phase with the RF input signals to the feeds on the bottom broad wall.

In accordance with the concepts described herein, an example coaxial-to-waveguide power combiner/divider device and method provides a reduced height waveguide, and multiple sections stacked vertically to realize high-order combining.

In accordance with the concepts described herein, example coaxial-to-waveguide power combiner/divider devices and methods are provided where a coaxial-to-waveguide interface may be potted, covered, or filled with a suitable dielectric (e.g., high-density polyethylene (HDPE)) to prevent breakdown in a high-field region.

In accordance with the concepts described herein, example coaxial-to-waveguide power combiner/divider devices and methods are provided with single fins between walls (e.g., symmetric 6:1, symmetric 24:1, asymmetric 5:1, etc.), where "single-fin" indicates fins on one broad wall of two broad walls facing each other.

In accordance with the concepts described herein, example coaxial-to-waveguide power combiner/divider devices and methods are provided with dual fins between walls (e.g., symmetric 12:1, etc.), where "dual-fin" indicates fins on both broad walls facing each other. Inputs attached to fins on one broad wall are 180 degrees out of phase with inputs attached to the other broad wall.

In accordance with the concepts described herein, an example coaxial-to-waveguide power combiner/divider device and method provide four 6-way combiners stacked to create a 24-way combiner in a full-height waveguide rectangular (WR) WR-284 waveguide, with equal phase inputs (e.g., no 180-degree shifts required), and where reduced-height combiners transition to a full-height waveguide via notched transitions.

In accordance with the concepts described herein, an example coaxial-to-waveguide power combiner/divider device and method provides a reduced-height asymmetric five-way combiner.

In accordance with the concepts described herein, an example coaxial-to-waveguide power combiner/divider device and method provide tapered-fins (e.g., wide tapered-fins) on one or both broad walls of a waveguide to accommodate multiple coaxial inputs and yield wideband power combining.

In accordance with the concepts described herein, an example coaxial-to-waveguide power combiner/divider device and method provide a folded matching slot along a back wall of the waveguide that extends along a gap between a fin and a corresponding broad wall of the waveguide to improve impedance matching and bandwidth.

In accordance with the concepts described herein, an example coaxial-to-waveguide power combiner/divider device and method provide stacked power combiners comprising multiple single-fin power combining sections implemented in a reduced-height waveguide (e.g., a 24-way combiner implemented using four stacked 6-way combiners).

In accordance with the concepts described herein, an example coaxial-to-waveguide power combiner/divider device and method provide asymmetric odd-order power combiners (e.g., a 5-way combiner comprising two non-symmetric fins) with one fin on each half of the waveguide, where one fin has two coaxial inputs, and the other fin has three coaxial inputs.

In accordance with the concepts described herein, example coaxial-to-waveguide power combiner/divider devices and methods provide improved performance via tapered notch transitions from multiple stacked combiners in a reduced-height waveguide to a single full-height waveguide.

In accordance with the concepts described herein, an example coaxial-to-waveguide power combiner/divider device and methods provide tapered fins on one or both broad walls of the waveguide to yield wideband power combining.

BRIEF DESCRIPTION OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the detailed description of the different views. Furthermore, embodiments are illustrated by way of example and not limitation in the figures, in which.

DETAILED DESCRIPTION OF THE INVENTION

Example embodiment of the present disclosure provides coaxial-to-waveguide power combiner/divider devices and methods.

In accordance with the concepts described herein, example coaxial-to-waveguide power combiner/divider devices and methods provide a wideband power combiner/divider having a large number of coaxial-to-waveguide transitions to provide a bridge between the two-transport media.

In accordance with the concepts described herein, the present disclosure provides an example wideband coaxial-to-waveguide power combiner/divider having a coaxial/waveguide interface capable of withstanding high peak power levels without breakdown.

In an example waveguide, the waveguide comprises a hollow metal box open only on one end (e.g., an output end). At the other end (e.g., an input end), coaxial inputs are located, where holes in a metal wall of the input end accommodate coaxial transmission lines. The diameter of each hole comprises the same diameter as that of a coaxial cable comprising insulation (e.g., dielectric surrounding a center conductor) of the corresponding coaxial transmission line. An outer conductor of the coaxial transmission line (not shown) is joined to a back wall of the input end of the waveguide. The center conductor penetrates into the waveguide and joins to a fin.

In an example waveguide, an overall length of the waveguide has little bearing on performance. A distance between the ends of fins and an open end of the waveguide or between an end of a tapered notch and the open end of the waveguide is set to improve RF fidelity. Electromagnetic fields at the end of each fin comprise a superposition of waveguide modes, of which only one may propagate (e.g., the fundamental $TE_{10}$ mode). Other modes decay exponentially with distance away from the end of the fin. The waveguide must be long enough that these modes are extinguished before reaching the open end, otherwise performance may be affected.

Figure 1:
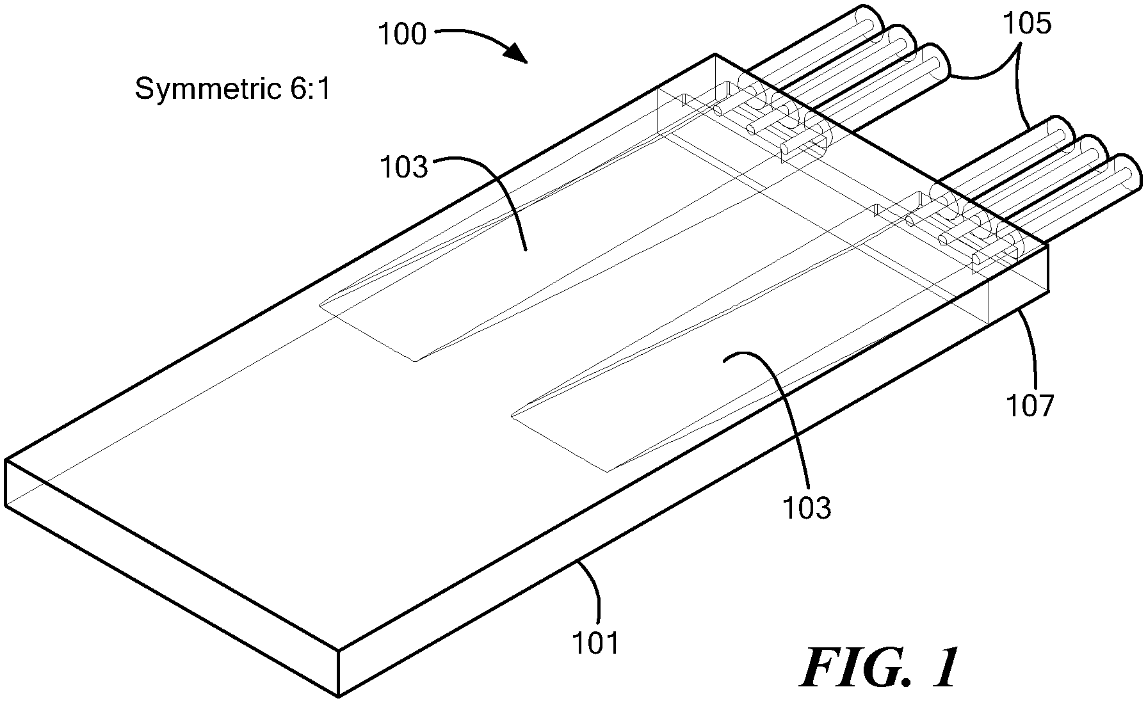
FIG. 1 is a perspective view of an example embodiment of a single-fin symmetric 6:1 coaxial-to-waveguide power combiner/divider in accordance with the concepts described herein.

FIG. 1 is a perspective view of an example embodiment of a single-fin symmetric 6:1 coaxial-to-waveguide power combiner/divider 100 in accordance with the concepts described herein. However, the present disclosure is not limited to 6 coaxial inputs. Any even or odd number of coaxial inputs may be used.

In an example embodiment, the single-fin symmetric 6:1 coaxial-to-waveguide power combiner/divider 100 includes a waveguide 101, two fins 103, and 6 coaxial inputs 105.

The waveguide 101 shown in FIG. 1 is a rectangular, four-walled conductive container opened at one end, where two opposing walls are broader than the other two opposing walls. However, the present disclosure is not limited thereto. The waveguide 101 may be any suitable shape (e.g., hexagonal, octagonal, etc.), where there are more than two less-broad walls. The waveguide 101 is conductive (e.g., metallic or a non-conductive material with a metallic material deposited on interior surfaces of the waveguide). Metallic waveguides include copper, aluminum, brass, tin, etc.

Non-conductive materials include plastics, polymers, etc. The non-conductive material may have a high thermal conductivity to aid in heat dissipation. There may be only one open end on each waveguide. The back wall where the center conductors of the coaxial inputs come through comprises metal walls with holes to accommodate the coaxial input transmission lines.

Two fins 103 in a plane are shown in FIG. 1. However, the present disclosure is not limited thereto. In an alternate embodiment, there may be two or more fins, where each fin is broad and capable of accommodating multiple coaxial inputs. There may be any number of fins per plane. The two fins 103 are conductive (e.g., metallic or a non-conductive material with a metallic material deposited on exterior surfaces of each fin). Metallic fins 103 include copper, aluminum, brass, tin, etc. Non-conductive materials include plastics, polymers, etc.

The two fins 103 form a symmetric even-order power combiner/divider (e.g., a 6:1 combiner/divider comprising two symmetric fins) with one fin on each half of the waveguide 101, where one fin has three coaxial inputs, and the other fin has three coaxial inputs.

The two fins 103 are illustrated as tapered (e.g., fin shaped). However, the present disclosure is not limited thereto. The two fins 103 may each be rectangular, curved, stair-stepped, or any other suitable shape. In an alternate embodiment, the two fins 103 are tapered in both width and height. In an alternate embodiment, each of the two fins 103 may be notched at an end that joins to the six coaxial inputs 105, where the notch may be used to improve impedance matching and bandwidth. In an embodiment, the notch may be a folded matching slot along a back wall of the waveguide 101 that extends along a gap between the two fins 103 and a corresponding broad wall of the waveguide 101 to improve impedance matching and bandwidth.

The two fins 103 are attached on one surface to one or both of the broad walls of the waveguide 101 to yield wideband power combining, where all of the six coaxial inputs 105 have a common phase. In an example waveguide, the fins may both be attached to the top wall, both be attached to the bottom wall, or one fin may be attached to one wall while the other fin may be attached to the other wall. When the fins are attached to different walls, the waveguide would be a "dual-fin" waveguide that requires the inputs to each fin be 180 degrees out of phase.

"Single-fin" indicates that there is only one fin between the broad wall to which the two fins 103 are attached and the opposing broad wall (e.g., symmetric 6:1, symmetric 24:1, asymmetric 5:1, etc.). However, "single-fin" does not limit the number of fins 103 per plane.

Six coaxial inputs 105 are shown in FIG. 1 (e.g., 3 coaxial inputs per fin 103). However, the present disclosure is not limited thereto. Any even or odd number of coaxial inputs 105 may be used. A center conductor of each of the six coaxial inputs 105 is joined to one of the two fins 103. The two fins 103 may be attached to both broad walls of the waveguide 101. The six coaxial inputs 105 may be joined to the two fins 103 by soldering, welding, connecting, compressing, inserting, etc.

In an alternate embodiment, the waveguide 101 device may include one or more additional walls (e.g., multiple sections stacked vertically to realize high order combining) to which additional fins are attached as described below in greater detail. In an alternate embodiment, performance may be improved via tapered notch transitions from multiple stacked combiners/dividers (e.g., fins) in a reduced-height waveguide to a single full-height waveguide.

In an alternate embodiment, the area where the six coaxial inputs 105 join to the two fins 103 may be potted with a suitable dielectric 107 (e.g., high-density polyethylene (HDPE)) to prevent breakdown in a high-field region.

Figure 2:
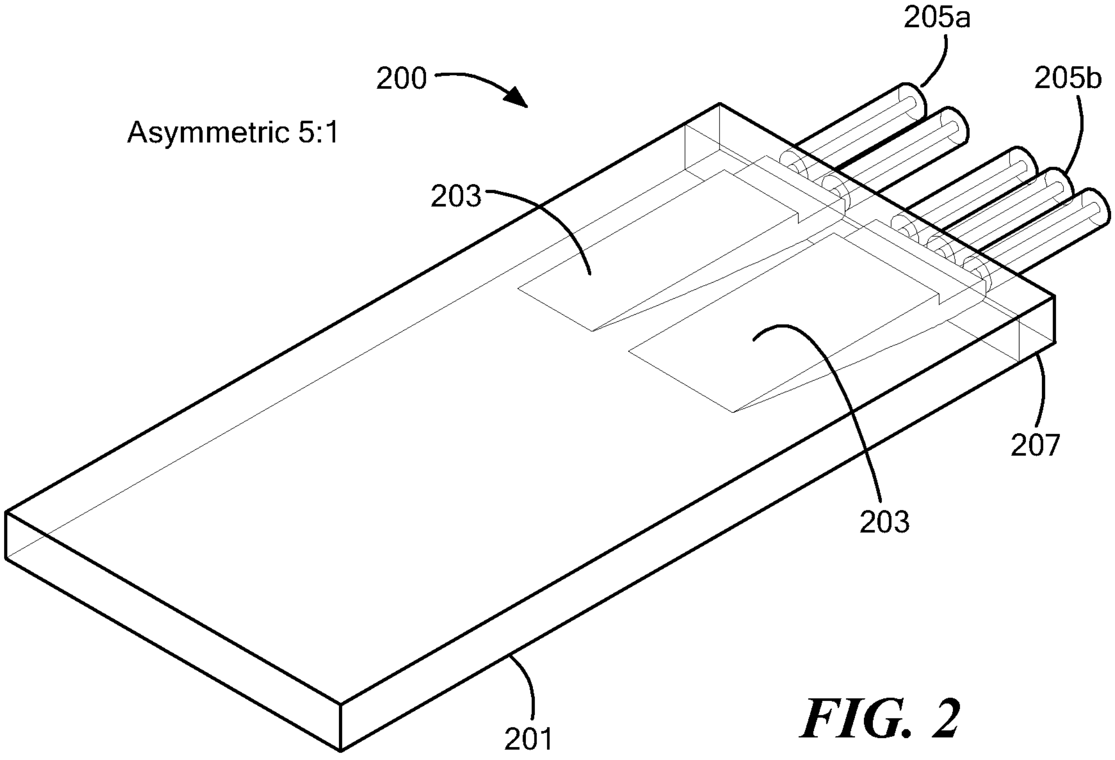
FIG. 2 is a perspective view of an example embodiment of a single-fin asymmetric 5:1 coaxial-to-waveguide power combiner/divider in accordance with the concepts described herein.

FIG. 2 is a perspective view of an example embodiment of a single-fin asymmetric 5:1 coaxial-to-waveguide power combiner/divider 200 in accordance with the concepts described herein.

In an example embodiment, the single-fin asymmetric 5:1 coaxial-to-waveguide power combiner/divider 200 includes a waveguide 201, two fins 203, and 5 coaxial inputs divided into a first group of two coaxial inputs 205*a* and a second group of three coaxial inputs 205*b*.

The coaxial-to-waveguide combiner/divider 200 provides an asymmetric odd-order power combiner/divider (e.g., a 5:1 combiner/divider comprising two asymmetric fins) with one fin on each half of the waveguide 201, where one fin has two coaxial inputs, and the other asymmetric fin has three coaxial inputs.

The waveguide 201 shown in FIG. 2 is a rectangular, four-walled conductive container opened at one end and closed at the other end, where two opposing walls are broader than the other two opposing walls. However, the present disclosure is not limited thereto. The waveguide 201 may be any suitable shape (e.g., hexagonal, octagonal, etc.), where there are more than two less-broad walls. The waveguide 201 is conductive (e.g., metallic or a non-conductive material with a metallic material deposited on interior surfaces of the waveguide). Metallic waveguides include copper, aluminum, brass, tin, etc.). Non-conductive materials include plastics, polymers, etc. The non-conductive material may have a high thermal conductivity to aid in heat dissipation. There may be only one open end on each waveguide. The back wall where the center conductors of the coaxial inputs come through comprises metal walls with holes to accommodate the coaxial input transmission lines.

Two fins 203 in a plane are shown in FIG. 2. However, the present disclosure is not limited thereto. In an alternate embodiment, there may be two or more fins, where each fin is broad and capable of accommodating multiple coaxial inputs. There may be any number of fins per plane. The two fins 203 are conductive (e.g., metallic or a non-conductive material with a metallic material deposited on exterior surfaces of the fin). Metallic fins 203 include copper, aluminum, brass, tin, etc.). Non-conductive materials include plastics, polymers, etc.

The two fins 203 form an asymmetric odd-order power combiner/divider (e.g., a 5-way combiner/divider comprising two asymmetric fins) with one fin on each half of the waveguide 201, where one fin has two coaxial inputs, and the other fin has three coaxial inputs.

The two fins 203 are illustrated as tapered (e.g., fin shaped). However, the present disclosure is not limited thereto. The two fins 203 may each be rectangular, curved, stair-stepped, or any other suitable shape. In an alternate embodiment, the two fins 203 may have different lengths and/or widths. In an alternate embodiment, the two fins 103 are tapered in both width and height. In an alternate embodiment, each of the two fins 203 may be notched at an end that joins to the five coaxial inputs 205*a* and 205*b*, where the notch may be used to improve impedance matching and bandwidth. In an embodiment, the notch may be a folded matching slot along a back wall of the waveguide 201 that extends along a gap between the two fins 203 and a corresponding broad wall of the waveguide 201 to improve impedance matching and bandwidth. In an example waveguide, there is a length (e.g., a minimum length) of the waveguide between an end of a fin and an open end of the waveguide to allow any higher-order non-propagating waveguide modes to die out, so only a particular mode (e.g., the fundamental TE10 mode) is present at the output.

The two fins 203 are attached to one or both of the broad walls of the waveguide 201 to yield wideband power combining, where all of the 5 coaxial inputs 205*a* and 205*b* have a common phase. Attaching fins to both broad walls requires that the coaxial inputs associated with one broad wall be 180 degrees out of phase with those associated with the other broad wall. In addition, attaching the fins on different walls results in a "dual-fin" waveguide.

"Single-fin" indicates that there is only one fin between the broad wall to which the two fins 203 are attached and the opposing broad wall (e.g., symmetric 6:1, symmetric 24:1, asymmetric 5:1, etc.). However, "single-fin" does not limit the number of fins 203 per plane. "Single-fin" indicates that the one or more fins are attached to one broad wall of the waveguide and not to the other broad wall.

Five coaxial inputs 205*a* and 205*b* are shown in FIG. 2 (e.g., 2 coaxial inputs on one fin 203 and 3 coaxial inputs on the other fin 203). However, the present disclosure is not limited thereto. Any even or odd number of coaxial inputs 205*a* and 205*b* may be used. A center conductor of each of the five coaxial inputs 205*a* and 205*b* is joined to one of the two fins 203. In an example waveguide, the fins may both be attached to the top wall, both be attached to the bottom wall, or one fin may be attached to one wall while the other fin may be attached to the other wall. When the fins are attached to different walls, the waveguide would be a "dual-fin" waveguide that requires the inputs to each fin be 180 degrees out of phase. The five coaxial inputs 205*a* and 205*b* may be joined to the two fins 203 by soldering, welding, connecting, compressing, inserting, etc.). In an example waveguide, the fins may both be attached to the top wall, both be attached to the bottom wall, or one fin may be attached to one wall while the other fin may be attached to the other wall. When the fins are attached to different walls, the waveguide would be a "dual-fin" waveguide that requires the inputs to each fin be 180 degrees out of phase.

In an alternate embodiment, the waveguide 201 device may include one or more additional walls (e.g., multiple sections stacked vertically to realize high order combining) to which additional fins are attached as described below in greater detail. In an alternate embodiment, performance may be improved via tapered notch transitions from multiple stacked combiners/dividers (e.g., fins) in a reduced-height waveguide to a single full-height waveguide.

In an alternate embodiment, the area where the five coaxial inputs 205*a* and 205*b* join to the two fins 203 may be potted, covered, or filled with a suitable dielectric 207 (e.g., HDPE) to prevent breakdown in a high-field region.

Figure 3:
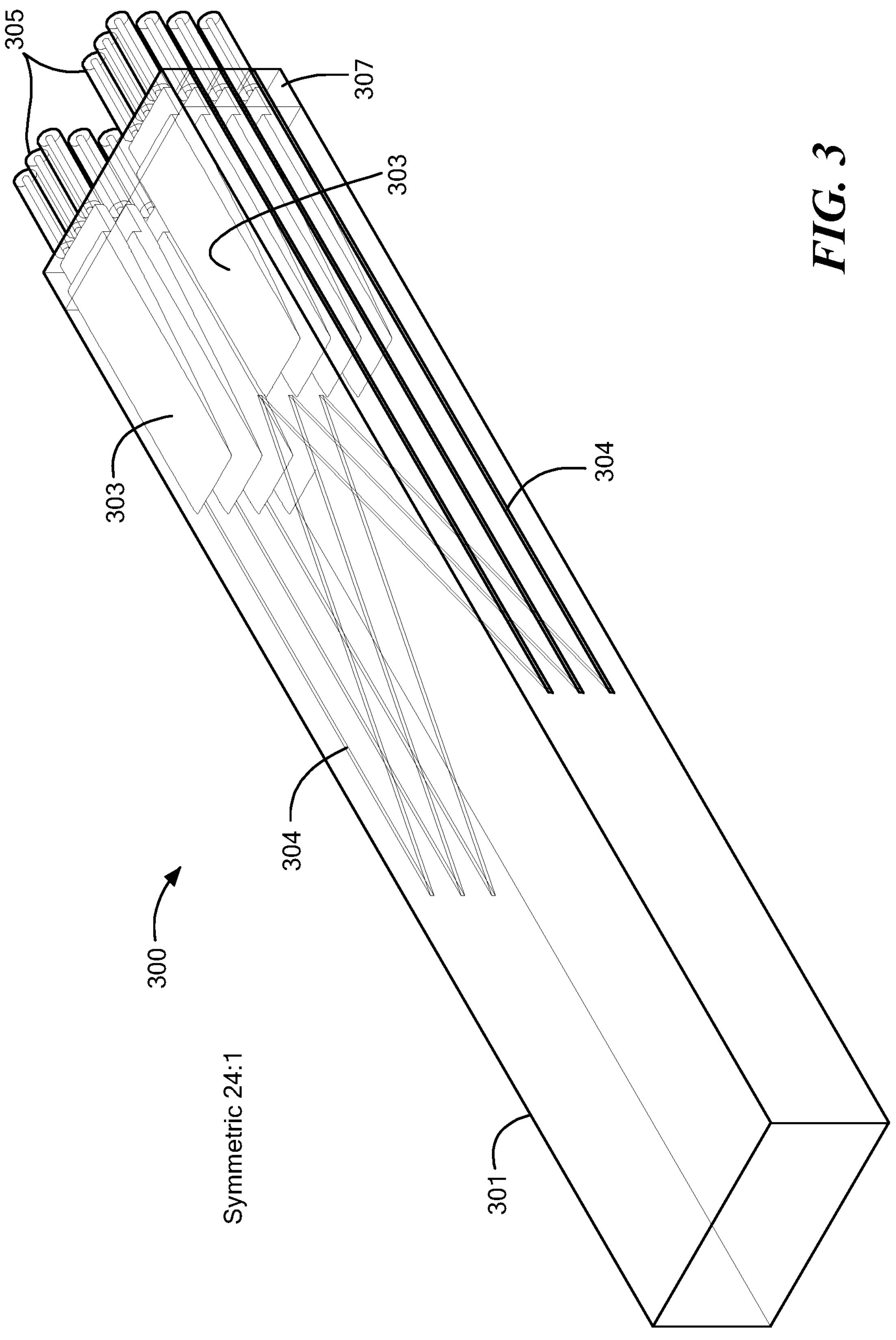
FIG. 3 is a perspective view of an example embodiment of a single-fin symmetric 24:1 coaxial-to-waveguide power combiner/divider in accordance with the concepts described herein.

FIG. 3 is a perspective view of an example embodiment of a single-fin symmetric 24:1 coaxial-to-waveguide power combiner/divider 300 in accordance with the concepts described herein.

In an example embodiment, the coaxial-to-waveguide device power combiner/divider 300 includes multiple single-fin power combining sections implemented in a reduced-height waveguide (e.g., a 24:1 combiner implemented using four stacked 6:1 combiners). The four 6:1 combiners/dividers stacked to create a 24-way combiner in a full-height rectangular waveguide (e.g., WR-284) has equal phase inputs (e.g., no 180-degree shifts required), where reduced-height combiners transition to a full-height waveguide via notched transitions.

In an example embodiment, the single-fin symmetric 24:1 coaxial-to-waveguide power combiner/divider 300 includes a waveguide 301, three additional walls 304, eight fins 303 (e.g., 2 fins in a plane between two walls 304), and 24 coaxial inputs 305 (e.g., 3 coaxial inputs per fin 303).

The waveguide 301 shown in FIG. 3 is a rectangular, five-walled conductive container opened at one end and closed at the other end with three additional walls between the two outer walls of the waveguide 301 to divide the waveguide 301 into four sections (e.g., equal-height sections, unequal-height sections), where the two outer opposing walls of the waveguide 301 are broader than the other two outer opposing walls of the waveguide 301. However, the present disclosure is not limited thereto. The waveguide 301 may be any suitable shape (e.g., hexagonal, octagonal, etc.), where there are more than two less-broad walls and the three additional walls 304 may divide the waveguide 301 into any suitable arrangement of heights (e.g., all four heights unequal, some heights equal, etc.). The waveguide 301 and the three additional walls 304 are conductive (e.g., metallic or a non-conductive material with a metallic material deposited on interior surfaces of the waveguide). Metallic waveguides and additional walls include copper, aluminum, brass, tin, etc. Non-conductive materials include plastics, polymers, etc. The non-conductive material may have a high thermal conductivity to aid in heat dissipation. There may be only one open end on each waveguide. The back wall where the center conductors of the coaxial inputs come through comprises metal walls with holes to accommodate the coaxial input transmission lines.

The three additional walls 304 are shown in FIG. 3 as being tapered (e.g., tapering from a center point to two outer points). However, the present disclosure is not limited thereto. The three additional walls 304 may be as the broad outer walls of the waveguide 301, curved, stair-stepped, etc.

Two fins 303 per plane in four planes separated by the additional walls 304 are shown in FIG. 3. However, the present disclosure is not limited thereto. In an alternate embodiment, there may be two or more fins per plane, where each fin is broad and capable of accommodating multiple coaxial inputs. There may be any number of fins per plane. The two fins 303 per plane in the four planes are conductive (e.g., metallic or a non-conductive material with a metallic material deposited on exterior surfaces of each fin). Metallic fins 103 include copper, aluminum, brass, tin, etc. Non-conductive materials include plastics, polymers, etc.

The two fins 303 per plane in the four planes form a symmetric even-order power combiner/divider (e.g., a 24:1 combiner/divider comprising two symmetric fins per plane) with two fins per plane on each half of the waveguide 301, where one fin has three coaxial inputs and the other fin in the plane has three coaxial inputs.

The two fins 303 per plane in the four planes are illustrated as tapered (e.g., fin shaped). However, the present disclosure is not limited thereto. The two fins 303 per plane in the four planes may each be rectangular, curved, stair-stepped, or any other suitable shape. In an alternate embodiment, the two fins 303 per plane in the four planes may have different lengths and/or widths. In an alternate embodiment, the two fins 303 are tapered in both width and height. In an alternate embodiment, each of the two fins 303 per plane in the four planes may be notched at an end that joins to the 24 coaxial inputs 305, where the notch may be used to improve impedance matching and bandwidth. In an embodiment, the notch may be a folded matching slot along a back wall of the waveguide 301 that extends along a gap between the two fins 303 per plane in the four planes and a corresponding broad wall of the waveguide 301 to improve impedance matching and bandwidth.

The two fins 303 per plane in the four planes are attached to one or both of corresponding broad walls of the waveguide 301 to yield wideband power combining, where all of the 24 coaxial inputs 305 have a common phase when the fins are attached to the same wall but the coaxial inputs 305 are 180 degrees out of phase when the fins attached to different walls (e.g., both fins on the top wall, both fins on the bottom wall, or one fin on the top wall and one fin on the bottom wall, where the phases of the inputs must be 180 degrees out of phase when the fins are on different walls). That is, the two fins 303 closest to an outer broad wall of the wave guide 301 may be attached to the outer broad wall or the closest additional wall 304. Two fins 303 between two additional walls 304 may be attached to either of the two additional walls 304. In an example waveguide, the fins may both be attached to the top wall, both be attached to the bottom wall, or one fin may be attached to one wall while the other fin may be attached to the other wall. When the fins are attached to different walls, the waveguide would be a "dual-fin" waveguide that requires the inputs to each fin be 180 degrees out of phase.

"Single-fin" indicates that there is only one fin between the broad wall to which the two fins 303 per plane are attached and the opposing broad wall (e.g., symmetric 6:1, symmetric 24:1, asymmetric 5:1, etc.). However, "single-fin" does not limit the number of fins 303 per plane. "Single-fin" indicates that the one or more fins are attached to one broad wall of the waveguide and not to the other broad wall.

Twenty-four coaxial inputs 305 are shown in FIG. 3 (e.g., 3 coaxial inputs per fin 303). However, the present disclosure is not limited thereto. Any even or odd number of coaxial inputs 305 may be used. A center conductor of each of the 24 coaxial inputs 305 is joined to one of the two fins 303 per plane in the four planes. The two fins 303 per plane in the four planes may be attached to both corresponding broad walls of the waveguide 301. The 24 coaxial inputs 305 may be joined to the two fins 303 per plane in the four planes by soldering, welding, connecting, compressing, inserting, etc.).

The waveguide 301 device includes three additional walls 304 (e.g., multiple sections stacked vertically to realize high order combining) to which the two fins 303 per plane in the four planes are attached. Performance may be improved via tapered notch transitions from multiple stacked combiners/dividers (e.g., fins) in a reduced-height waveguide to a single full-height waveguide.

In an alternate embodiment, the area where the 24 coaxial inputs 305 join to the two fins 303 per plane may be potted with a suitable dielectric 307 (e.g., HDPE) to prevent breakdown in a high-field region.

Figure 4:
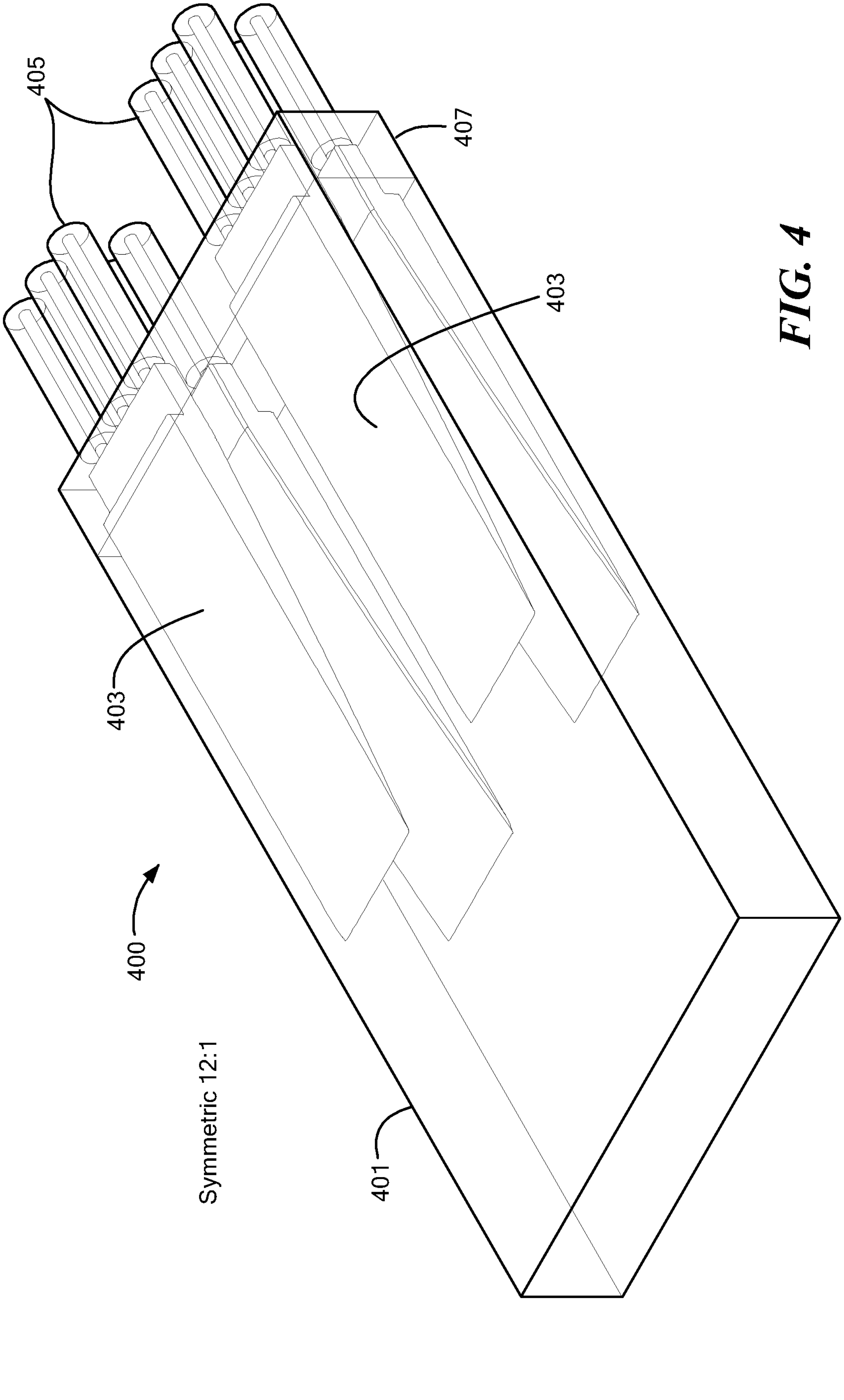
FIG. 4 is a perspective view of an example embodiment of a dual-fin symmetric 12:1 coaxial-to-waveguide power combiner/divider in accordance with the concepts described herein.

FIG. 4 is a perspective view of an example embodiment of a dual-fin symmetric 12:1 coaxial-to-waveguide power combiner/divider 400 in accordance with the concepts described herein. "Dual-fin" indicates that fins come in pairs, one attached to one broad wall of the waveguide, and one attached to the other broad wall.

In an example embodiment, the dual-fin symmetric 12:1 coaxial-to-waveguide power combiner/divider 400 includes a waveguide 401, two fins 403 per plane in two planes, and 12 coaxial inputs 405.

The waveguide 401 shown in FIG. 4 is a rectangular, four-walled conductive container opened at one end and closed at the other end, where two opposing walls are broader than the other two opposing walls. However, the present disclosure is not limited thereto. The waveguide 401 may be any suitable shape (e.g., hexagonal, octagonal, etc.), where there are more than two less-broad walls. The waveguide 401 is conductive (e.g., metallic or a non-conductive material with a conductive coating). Metallic waveguides include copper, aluminum, brass, tin, etc.). Non-conductive materials include carbon-infused plastics and polymers, graphite-infused plastics and polymers, etc.).

Two fins 403 per plane in two planes are shown in FIG. 4. However, the present disclosure is not limited thereto. In an alternate embodiment, there may be two or more fins, where each fin is broad and capable of accommodating multiple coaxial inputs. There may be any number of fins per plane. The two fins 403 per plane in the two planes are conductive (e.g., metallic or a non-conductive material with a metallic material deposited on exterior surfaces of each fin). Metallic fins 403 include copper, aluminum, brass, tin, etc. Non-conductive materials include plastics, polymers, etc.

The two fins 403 per plane in the two planes form a symmetric even-order power combiner/divider (e.g., a 12:1 combiner/divider comprising two symmetric fins per plane in two planes) with one symmetric even-order power combiner/divider on each half of the waveguide 401, where one symmetric even-order power combiner/divider has three coaxial inputs, and the other symmetric even-order power combiner/divider has three coaxial inputs.

The two fins 403 per plane in the two planes are illustrated as tapered (e.g., fin shaped). However, the present disclosure is not limited thereto. The two fins 403 per plane in the two planes may each be rectangular, curved, stair-stepped, or any other suitable shape. In an alternate embodiment, the two fins 403 per plane in the two planes may have different lengths and/or widths. In an alternate embodiment, the two fins 403 are tapered in both width and height. In an alternate embodiment, each of the two fins 403 per plane in the two planes may be notched at an end that joins to the 12 coaxial inputs 405, where the notch may be used to improve impedance matching and bandwidth. In an embodiment, the notch may be a folded matching slot along a back wall of the waveguide 401 that extends along a gap between the two fins 403 per plane in the two planes and a corresponding broad wall of the waveguide 401 to improve impedance matching and bandwidth.

The two fins 403 per plane in the two planes are attached to one of the broad walls of the waveguide 401 to yield wideband power combining, where inputs attached to the top broad wall are 180 degrees out of phase with the inputs attached to the bottom broad wall.

"Dual-fin" indicates that are two fins between the broad wall to which the two fins 403 of one plane are attached and the opposing broad wall to which the two fins 403 of the other plane are attached (e.g., symmetric 6:1, symmetric 24:1, asymmetric 5:1, etc.). However, "dual-fin" does not limit the number of fins 403 per plane.

Twelve coaxial inputs 405 are shown in FIG. 4 (e.g., 3 coaxial inputs per fin 403). However, the present disclosure is not limited thereto. Any even or odd number of coaxial inputs 405 may be used. A center conductor of each of the 12 coaxial inputs 405 is joined to one of the two fins 403 per plane in the two planes. The two fins 403 per plane are attached to one of the broad walls of the waveguide 401. The 12 coaxial inputs 405 may be joined to the two fins 403 per plane in the two planes by soldering, welding, connecting, compressing, inserting, etc.).

In an alternate embodiment, the waveguide 401 device may include one or more additional walls (e.g., multiple sections stacked vertically to realize high order combining) to which additional fins are attached as described below in greater detail. Performance may be improved via tapered notch transitions from multiple stacked combiners/dividers (e.g., fins) in a reduced-height waveguide to a single full-height waveguide.

In an alternate embodiment, the area where the 12 coaxial inputs 405 join to the two fins 403 per plane in the two planes may be potted with a suitable dielectric 407 (e.g., HDPE) to prevent breakdown in a high-field region.

Figure 5:
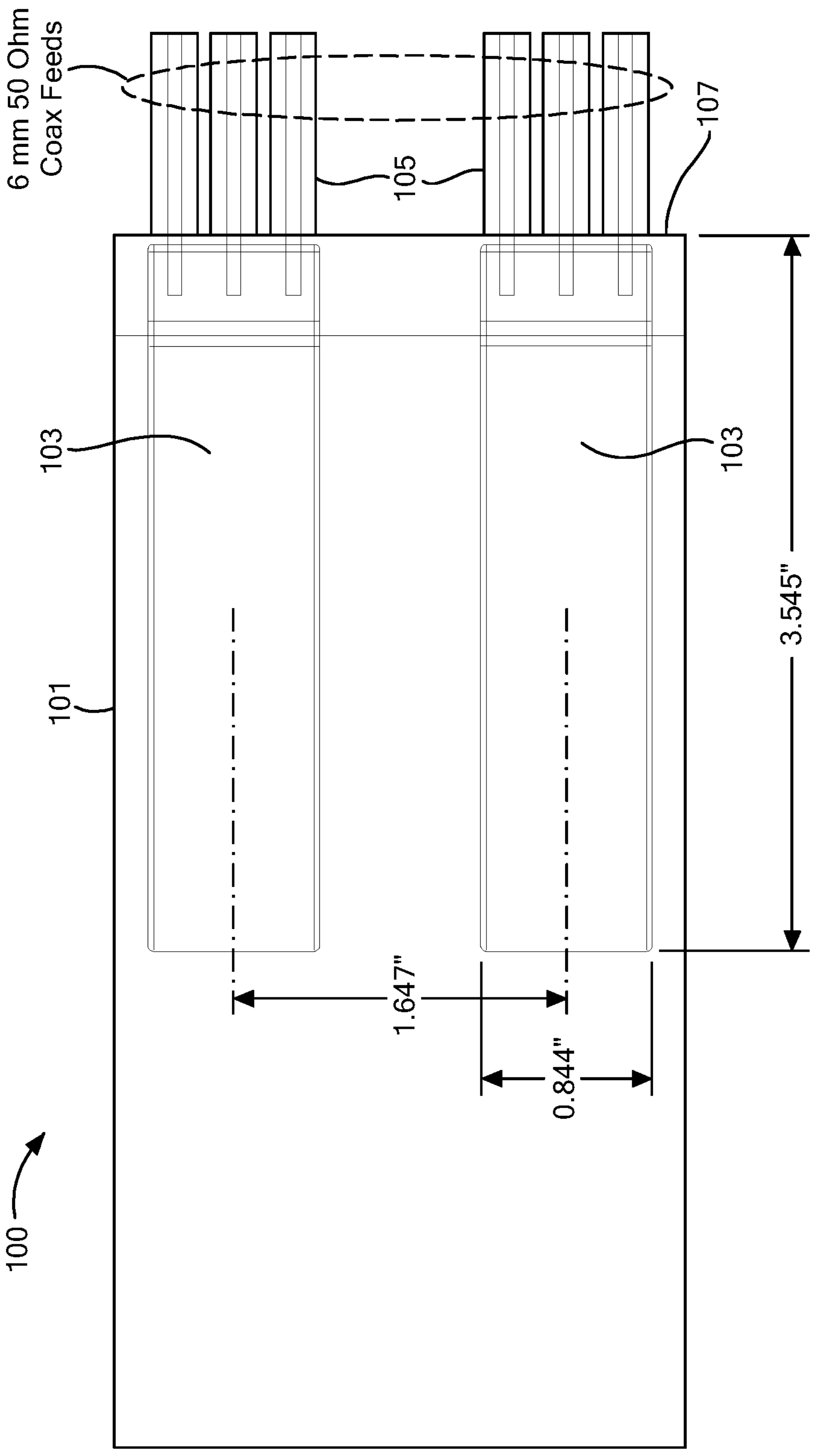
FIG. 5 is a top-view of the single-fin symmetric 6:1 coaxial-to-waveguide power combiner/divider of FIG. 1 in accordance with the concepts described herein.

FIG. 5 is a top-view of the single-fin symmetric 6:1 coaxial-to-waveguide power combiner/divider 100 of FIG. 1 in accordance with the concepts described herein. It is understood that the illustrated dimensions are examples and that any suitable dimensions and geometries can be used to meet the needs of a particular application.

In an example embodiment, the single-fin symmetric 6:1 coaxial-to-waveguide power combiner/divider 100 includes a waveguide 101, two fins 103, and 6 coaxial inputs 105 (Coax Feeds), where each of the two fins 103 are 0.844 inches wide, 3.545 inches long, and has a distance of 1.647 inches from a center of on one fin 103 to the center of the other fin 103.

In an example embodiment, the inside diameter of the outer conductor of each of the 6 coaxial inputs 105 is 6 mm wide with an impedance of 50 ohms.

Figure 6:
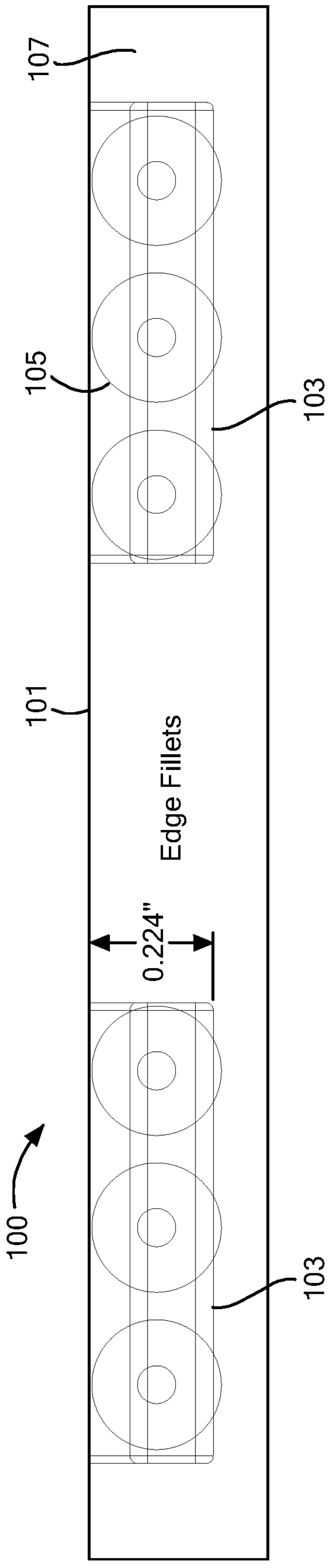
FIG. 6 is an end-view of the single-fin symmetric 6:1 coaxial-to-waveguide power combiner/divider of FIG. 5 in accordance with the concepts described herein.

FIG. 6 is an end-view of the single-fin symmetric 6:1 coaxial-to-waveguide power combiner/divider 100 of FIG. 5 in accordance with the concepts described herein. In the example of FIG. 6, it can be seen that edge fillets of the two fins 103 are 0.224" from a top edge of waveguide 101.

Figure 7:
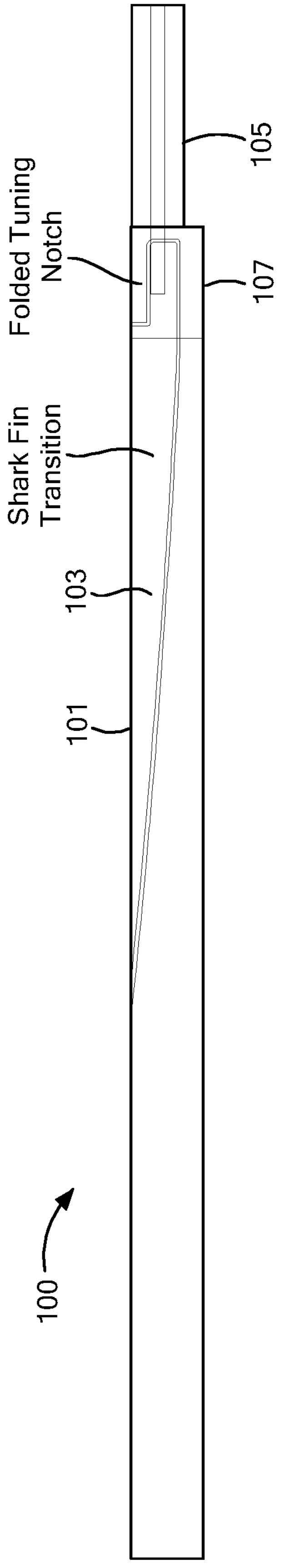
FIG. 7 is a side-view of the single-fin symmetric 6:1 coaxial-to-waveguide power combiner/divider of FIG. 5 in accordance with the concepts described herein.

FIG. 7 is a side-view of the single-fin symmetric 6:1 coaxial-to-waveguide power combiner/divider of 100 of FIG. 5 in accordance with the concepts described herein showing a taper (Shark Fin transition) of the fin 103 and a notch (e.g., a folded tuning notch) in the fin 103.

In an example embodiment, each of the two fins 103 are notched at an end that joins to the six coaxial inputs 105, where the notch may be used to improve impedance matching or tuning and bandwidth. In an example embodiment, the notch is a folded matching slot along a back wall of the waveguide 101 that extends along a gap between the two fins 103 and a corresponding broad wall of the waveguide 101 to improve impedance matching or tuning and bandwidth.

Figure 8:
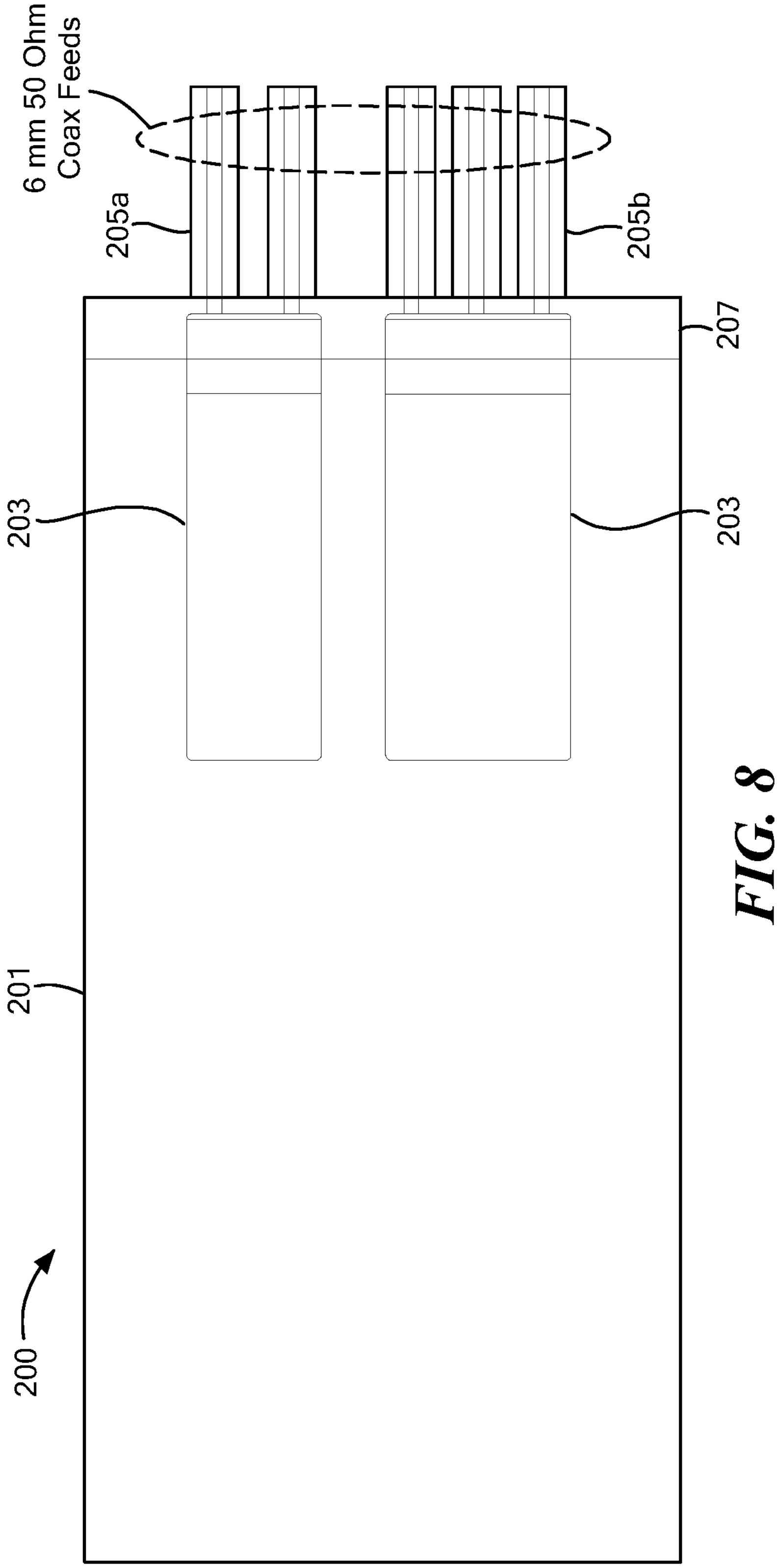
FIG. 8 is a top-view of the single-fin asymmetric 5:1 coaxial-to-waveguide power combiner/divider of FIG. 2 in accordance with the concepts described herein.

FIG. 8 is a top-view of the single-fin asymmetric 5:1 coaxial-to-waveguide power combiner/divider 200 of FIG. 2 in accordance with the concepts described herein.

In an example embodiment, the single-fin asymmetric 5:1 coaxial-to-waveguide power combiner/divider 200 includes a waveguide 201, two fins 203, and 5 coaxial inputs (Coax Feeds) divided into a first group of two coaxial inputs 205*a* and a second group of three coaxial inputs 205*b*.

In an example embodiment, the inside diameter of the outer conductor of each of the 5 coaxial inputs 205*a* and 205*b* is 6 mm wide with an impedance of 50 ohms.

Figure 9:
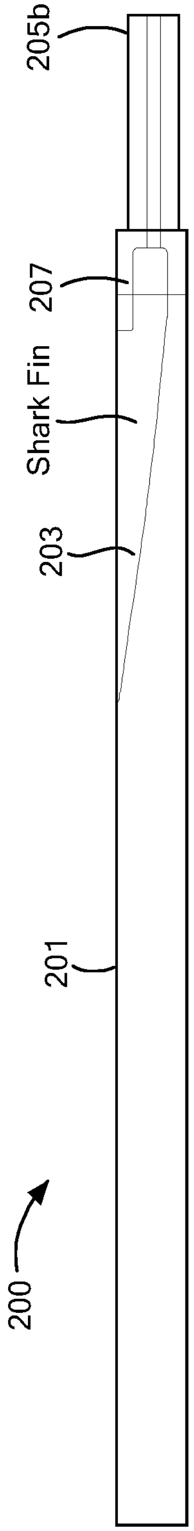
FIG. 9 is a side-view of the single-fin asymmetric 5:1 coaxial-to-waveguide power combiner/divider of FIG. 8 in accordance with the concepts described herein.

FIG. 9 is a side-view of the single-fin asymmetric 5:1 coaxial-to-waveguide power combiner/divider 200 of FIG. 8 in accordance with the concepts described herein showing the fin 203 (Shark Fin).

Figure 10:
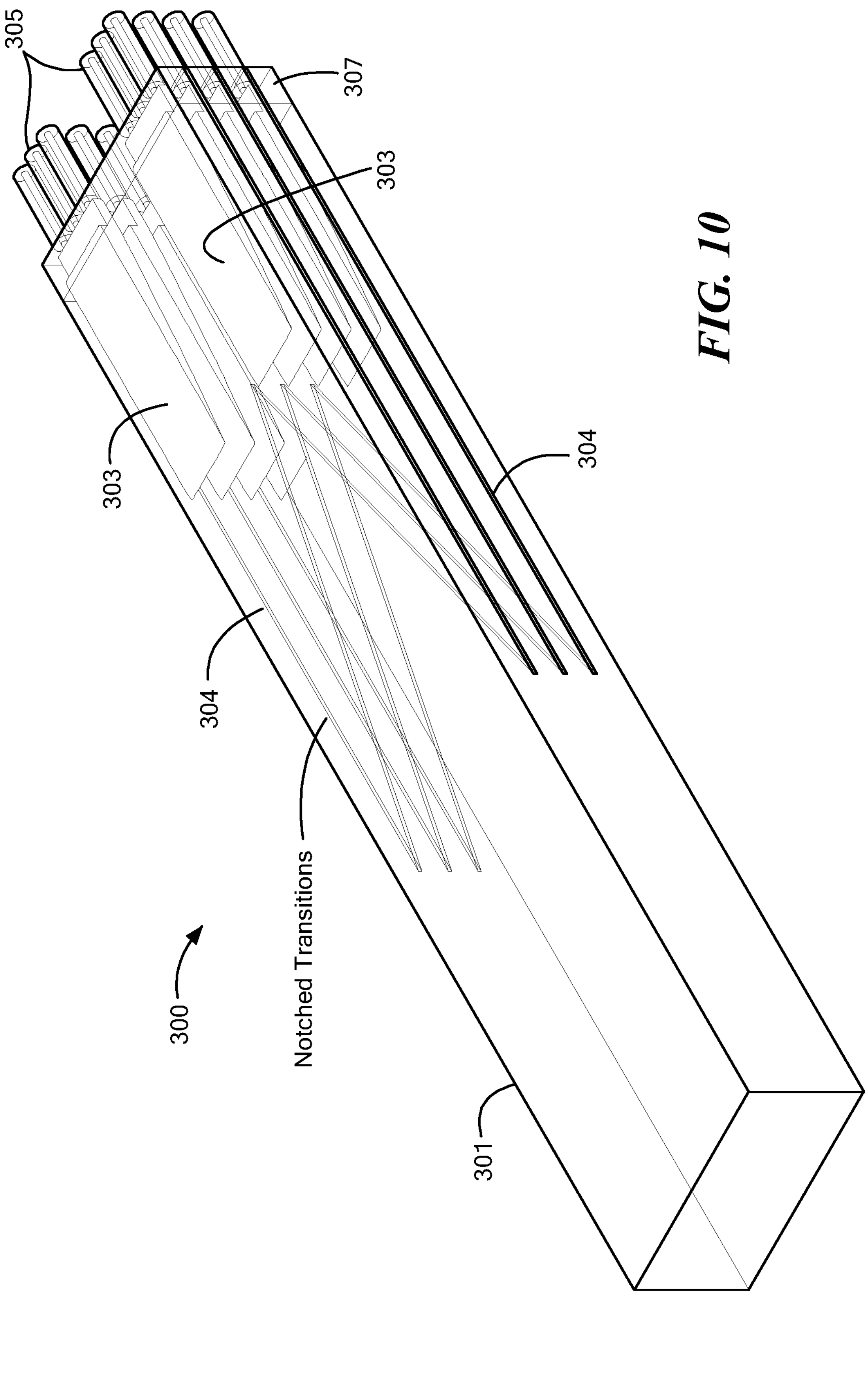
FIG. 10 is a perspective view of the single-fin symmetric 24:1 coaxial-to-waveguide power combiner/divider of FIG. 3 in accordance with the concepts described herein.

FIG. 10 is a perspective view of an example embodiment of the single-fin symmetric 24:1 coaxial-to-waveguide power combiner/divider 300 of FIG. 3 in accordance with the concepts described herein.

In an example embodiment, the single-fin symmetric 24:1 coaxial-to-waveguide power combiner/divider 300 includes a waveguide 301, three additional walls 304, eight fins 303 (e.g., 2 fins in a plane between two walls 304), and 24 coaxial inputs 305 (e.g., 3 coaxial inputs per fin 303).

In an example embodiment, the 24:1 coaxial-to-waveguide power combiner/divider 300 provides a reduced-height symmetric 24:1 combiner (e.g., a reduced-height waveguide with a 24:1 combiner/divider implemented using four stacked 6-way combiners/dividers). Each of the four stacked 6-way combiners has a reduced height, while the output of the 24:1 combiner itself is a full height waveguide.

In an example embodiment, the three additional walls 304 each have notched transitions.

Figure 11:
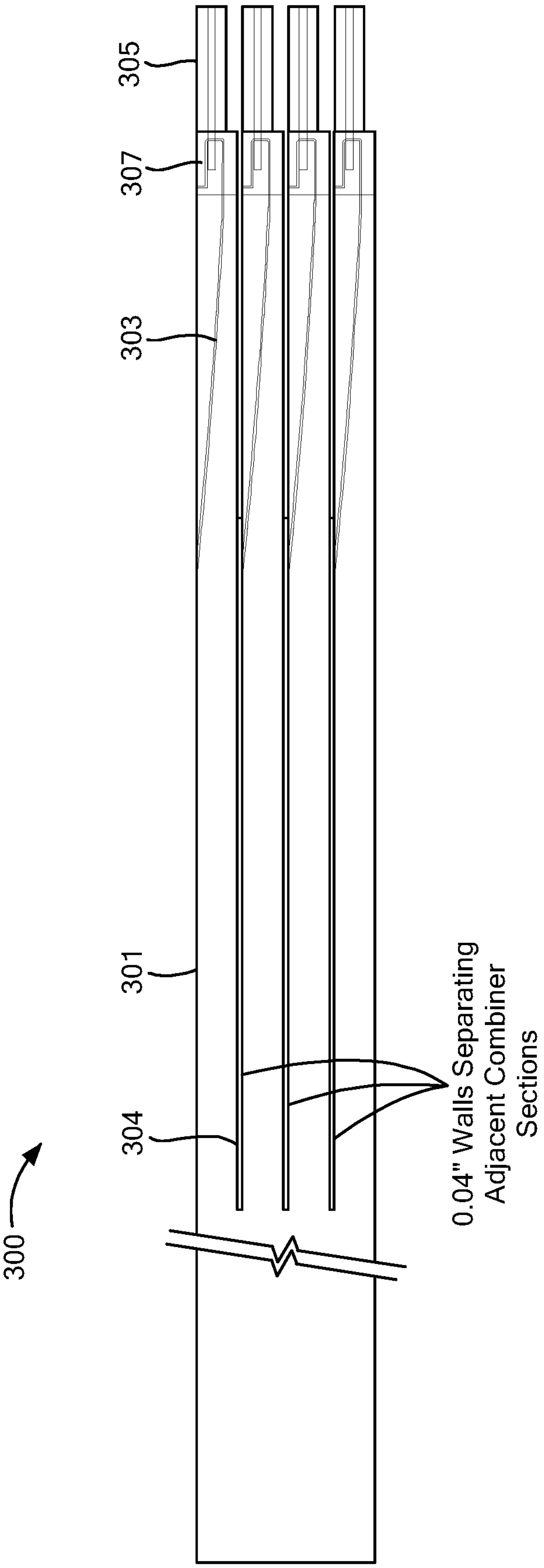
FIG. 11 is a side-view of the single-fin symmetric 24:1 coaxial-to-waveguide power combiner/divider of FIG. 10 in accordance with the concepts described herein.

FIG. 11 is a side-view of the single-fin symmetric 24:1 coaxial-to-waveguide power combiner/divider 300 of FIG. 10 in accordance with the concepts described herein. In the example of FIG. 11 it can be seen that walls 304 are separating adjacent combiner sections.

In an example embodiment, the three additional walls 304 are each 0.04 inches thick.

Figure 12:
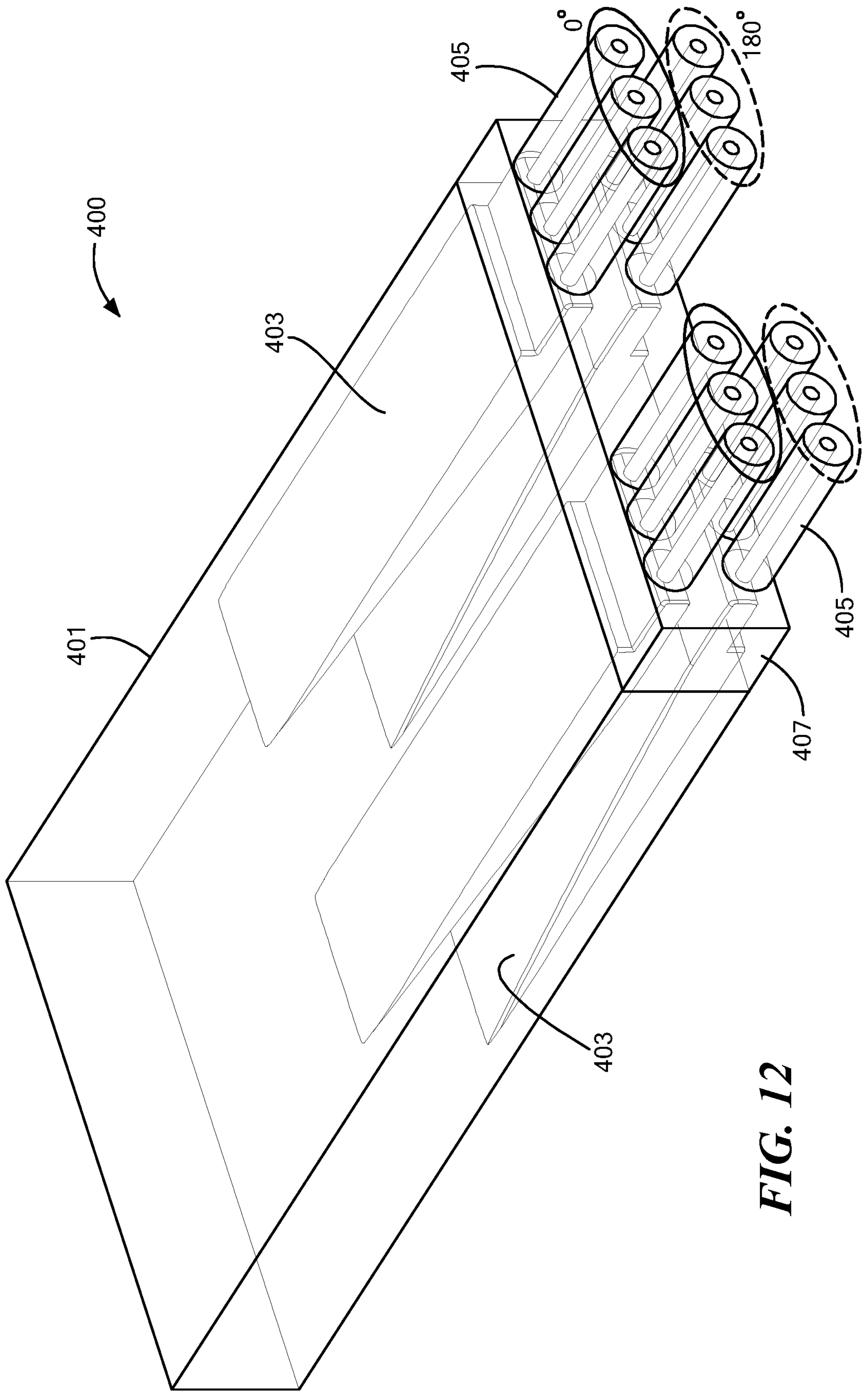
FIG. 12 is a perspective view of the dual-fin symmetric 12:1 coaxial-to-waveguide power combiner/divider of FIG. 4 in accordance with the concepts described herein.

FIG. 12 is a perspective view of an example embodiment of a dual-fin symmetric 12:1 coaxial-to-waveguide power combiner/divider 400 of FIG. 4 in accordance with the concepts described herein.

In an example embodiment, the dual-fin symmetric 12:1 coaxial-to-waveguide power combiner/divider 400 includes a waveguide 401, two fins 403 per plane in two planes, and 12 coaxial inputs 405.

In accordance with the concepts described herein, an example waveguide device and method provide symmetric fins on a top broad wall and a bottom broad wall of the waveguide to deposit power into the waveguide, where RF inputs to coaxial feeds on the top broad wall (such as 0°) and the bottom broad wall (such as 180°) are 180 degrees out of phase.

Figure 13:
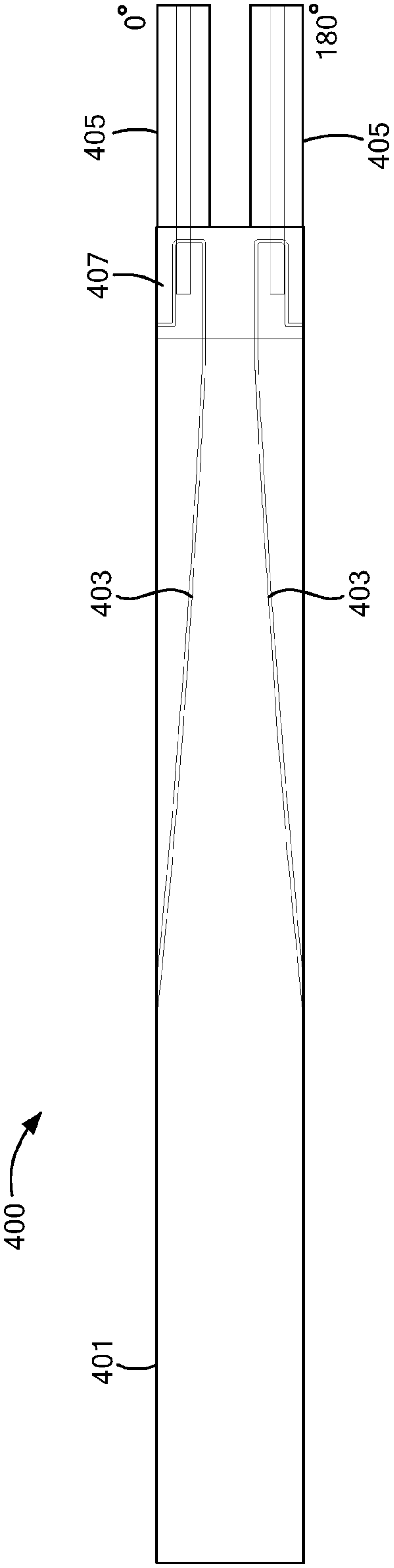
FIG. 13 is a side-view of the dual-fin symmetric 12:1 coaxial-to-waveguide power combiner/divider of FIG. 12 in accordance with the concepts described herein.

FIG. 13 is a side-view of the dual-fin symmetric 12:1 coaxial-to-waveguide power combiner/divider 400 of FIG. 12 in accordance with the concepts described herein.

In accordance with the concepts described herein, an example waveguide device and method provide symmetric fins on a top broad wall and a bottom broad wall of the waveguide to deposit power into the waveguide, where RF inputs to coaxial feeds on the top broad wall (such as 0°) and the bottom broad wall (such as 180°) are 180 degrees out of phase.

Figure 14:
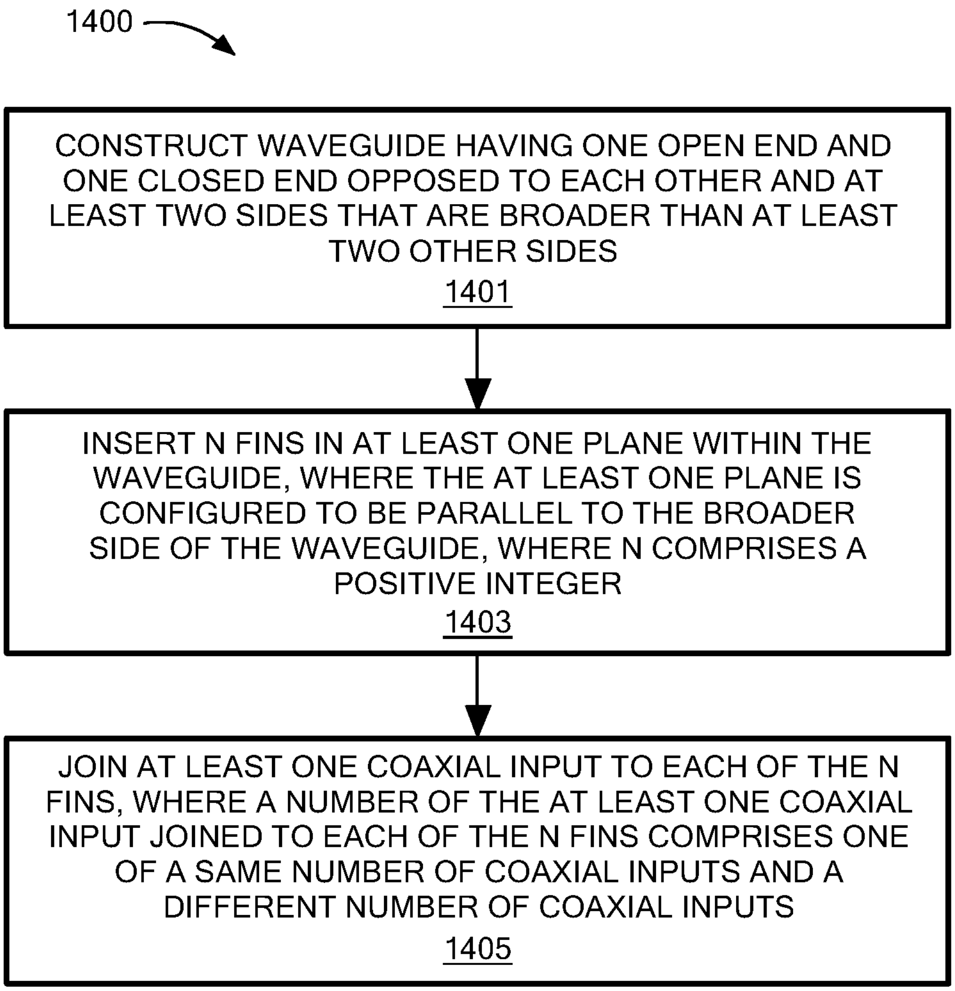
FIG. 14 is a flowchart of an example method of a coaxial-to-waveguide power combiner/divider in accordance with the concepts described herein.

FIG. 14 is a flowchart of an example method 1400 of a coaxial-to-waveguide power combiner/divider in accordance with the concepts described herein. In an example embodiment, the method 1400 of a coaxial-to-waveguide power combiner/divider includes constructing a waveguide having one open end and one closed end opposed to each other and at least two sides that are broader than at least two other sides in step 1401. The waveguide has a polygonal shape comprising one of a rectangular shape, a square shape, a hexagonal shape, an octagonal shape, and any other suitable polygonal shape.

Step 1403 of the method 1400 includes inserting n fins in at least one plane within the waveguide, wherein the at least one plane is configured to be parallel to the broader sides of the waveguide, wherein n comprises a positive integer. Each of the n fins have a tapered shape comprising one of a rectangular shape, a curved shape, a stair-stepped shape, and any other suitable geometric shape.

Step 1405 of the method 1400 includes joining at least one coaxial input to each of the n fins, wherein a number of the at least one coaxial input joined to each of the n fins comprises one of a same number of coaxial inputs and a different number of coaxial inputs. The same number of coaxial inputs and the different number of coaxial inputs each comprise one of an even number and an odd number.

The method 1400 further comprising a dielectric material potted in the waveguide where the n fins in at least one plane join the at least one coaxial input. The dielectric material includes high-density polyethylene (HDPE).

The waveguide and the n fins are each electrically conductive materials. The electrically conductive materials include one of a metal and a non-conductive material with a metallic material deposited on the interior surfaces of the waveguide and exterior surfaces of each fin.

The method 1400 further includes m walls within an interior of the waveguide configured to separate the interior of the waveguide into m+1 planes parallel to the broader sides of the waveguide, wherein m is a positive integer, and wherein each of the m+1 planes contain n fins.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub combination. Other embodiments not specifically described herein are also within the scope of the following claims.

Various embodiments of the concepts, systems, devices, structures and techniques sought to be protected are described herein with reference to the related drawings. As noted above, in embodiments, the concepts and features described herein may be embodied in a digital multi-beam beamforming system. Alternative embodiments can be devised without departing from the scope of the concepts, systems, devices, structures and techniques described herein.

It is noted that various connections and positional relationships (e.g., over, below, adjacent, etc.) are set forth between elements in the above description and in the drawings. These connections and/or positional relationships, unless specified otherwise, can be direct or indirect, and the described concepts, systems, devices, structures and techniques are not intended to be limiting in this respect. Accordingly, a coupling of entities can refer to either a direct or an indirect coupling, and a positional relationship between entities can be a direct or indirect positional relationship.

As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s). The following definitions and abbreviations are to be used for the interpretation of the claims and the specification. As used herein, the terms "comprises," "comprising, "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance, or illustration. Any embodiment or design described herein as "exemplary" is not necessarily to be construed as preferred or advantageous over other embodiments or designs. The terms "one or more" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection".

References in the specification to "one embodiment, "an embodiment," "an example embodiment," etc., indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

For purposes of the description herein, terms such as "upper," "lower," "right," "left," "vertical," "horizontal, "top," "bottom," (to name but a few examples) and derivatives thereof shall relate to the described structures and methods, as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements. Such terms are sometimes referred to as directional or positional terms.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways.

Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed is:

1. A single-fin coaxial-to-waveguide power combiner/divider device, comprising:

a waveguide having one open end, one closed end, and two sides that are broader than two other sides;

two fins in a plane within the waveguide, wherein the plane is configured to be parallel to the two broader sides of the waveguide; and a plurality of coaxial inputs, each coaxial input joined to a respective one of the two fins, wherein each of the two fins is joined to at least one of the coaxial inputs, wherein signals applied to the at least one coaxial input joined to each of the two fins are in phase with each other, and wherein each of the two fins is notched at an end that joins to the respective at least one coaxial input.

2. The device of claim 1, wherein each of the two fins has a tapered shape.

3. The device of claim 1, wherein each of the two fins is joined to a different number of the coaxial inputs.

4. The device of claim 1, wherein the waveguide has a polygonal shape.

5. The device of claim 1, wherein the waveguide and the two fins each comprise one or more electrically conductive materials.

6. A stacked single-fin coaxial-to-waveguide power combiner/divider device, comprising:

a waveguide having one open end, one closed end, and two sides that are broader than two other sides;

n−1 walls separating the waveguide into n planes, wherein n is a positive integer greater than or equal to 2;

two fins in each of the n planes, wherein each of the n planes is configured to be parallel to the two broader sides of the waveguide; and a plurality of coaxial inputs, each coaxial input joined to a respective one of the two fins within each of the n planes, wherein each of the two fins within each of the n planes is joined to at least one of the coaxial inputs, and wherein signals applied to the at least one coaxial input joined to each of the two fins in each of the n planes are in phase with each other.

7. The device of claim 6, wherein each of the two fins in each of the n planes has a tapered shape.

8. The device of claim 6, wherein each of the two fins in each of the n planes is notched at an end that joins to the respective at least one coaxial input.

9. The device of claim 6, wherein the waveguide has a polygonal shape.

10. The device of claim 6, wherein the waveguide and the two fins in each of the n planes each comprise one or more electrically conductive materials.

11. A dual-fin coaxial-to-waveguide power combiner/divider device, comprising:

a waveguide having one open end, one closed end, and two sides that are broader than two other sides;

four fins in a plane within the waveguide, wherein the plane is configured to be parallel to the two broader sides of the waveguide, and wherein two of the four fins representing upper fins are stacked above two other of the four fins representing lower fins; and a plurality of coaxial inputs, each coaxial input joined to a respective one of the four fins, wherein each of the four fins is joined to at least one of the coaxial inputs, wherein signals applied to the at least one coaxial input joined to each of the upper fins are in phase with each other, wherein signals applied to the at least one coaxial input joined to each of the lower fins are in phase with each other, and wherein the signals applied to the coaxial inputs joined to the upper fins are 180 degrees out of phase with the signals applied to the coaxial inputs joined to the lower fins.

12. The device of claim 11, wherein each of the four fins has a tapered shape.

13. The device of claim 11, wherein each of the four fins is notched at an end that joins to the respective at least one coaxial input.

14. The device of claim 11, wherein the waveguide has a polygonal shape.

15. The device of claim 11, wherein the waveguide and the four fins each comprise one or more electrically conductive materials.

16. A stacked dual-fin coaxial-to-waveguide power combiner/divider device, comprising:

a waveguide having one open end, one closed end, and two sides that are broader than two other sides;

n−1 walls separating the waveguide into n planes, wherein n is a positive integer greater than or equal to 2;

four fins within each of the n planes, wherein each of the n planes is configured to be parallel to the two broader sides of the waveguide, and wherein two of the four fins representing upper fins within one of the n planes are stacked above two other of the four fins representing lower fins within the one of the n planes; and a plurality of coaxial inputs, each coaxial input joined to a respective one of the four fins within one of the n planes, wherein each of the four fins within each of the n planes is joined to at least one of the coaxial inputs, wherein signals applied to the at least one coaxial input joined to each of the upper fins are in phase with each other, wherein signals applied to the at least one coaxial input joined to each of the lower fins are in phase with each other, and wherein the signals applied to the coaxial inputs joined to the upper fins are 180 degrees out of phase with the signals applied to the coaxial inputs joined to the lower fins.

17. The device of claim 16, wherein each of the four fins within each of the n planes has a tapered shape.

18. The device of claim 16, wherein each of the four fins within each of the n planes is notched at an end that joins to the respective at least one coaxial input.

19. The device of claim 16, wherein the waveguide has a polygonal shape.

20. The device of claim 16, wherein the waveguide and the four fins within each of the n planes each comprise one or more electrically conductive materials.

* * * * *